(12) United States Patent
Lee et al.

(10) Patent No.: US 11,415,823 B2
(45) Date of Patent: Aug. 16, 2022

(54) DISPLAY UNIT MANUFACTURING SYSTEM

(71) Applicant: LG CHEM, LTD., Seoul (KR)

(72) Inventors: Beom Seok Lee, Daejeon (KR); Yu Jin Lim, Daejeon (KR); Hang Suk Choi, Daejeon (KR); Eung Jin Jang, Daejeon (KR)

(73) Assignee: SHANJIN OPTOELECTRONICS (SUZHOU) CO., LTD., Jiangsu (CN)

( * ) Notice: Subject to any disclaimer, the term of this patent is extended or adjusted under 35 U.S.C. 154(b) by 115 days.

(21) Appl. No.: 16/959,367

(22) PCT Filed: Mar. 20, 2019

(86) PCT No.: PCT/KR2019/003237
§ 371 (c)(1),
(2) Date: Jun. 30, 2020

(87) PCT Pub. No.: WO2019/182348
PCT Pub. Date: Sep. 26, 2019

(65) Prior Publication Data
US 2021/0063780 A1 Mar. 4, 2021

(30) Foreign Application Priority Data

Mar. 23, 2018 (KR) .......................... 10-2018-0034080

(51) Int. Cl.
*G02F 1/13* (2006.01)
*G02F 1/1335* (2006.01)

(52) U.S. Cl.
CPC ...... *G02F 1/1303* (2013.01); *G02F 1/133528* (2013.01)

(58) Field of Classification Search
CPC ................. G02F 1/1303; G02F 1/1309; G02F 1/133528; B32B 41/00; B32B 2041/04; B32B 43/006
See application file for complete search history.

(56) References Cited

U.S. PATENT DOCUMENTS

| 2008/0002137 | A1 | 1/2008 | Kim et al. | |
|---|---|---|---|---|
| 2010/0282406 | A1* | 11/2010 | Kitada | B29D 11/0073 156/256 |
| 2011/0005656 | A1 | 1/2011 | Kitada et al. | |

FOREIGN PATENT DOCUMENTS

| JP | 2007313514 A | 12/2007 |
|---|---|---|
| JP | 2009204607 A | 9/2009 |

(Continued)

OTHER PUBLICATIONS

Translation of KR 10-2017-0119810 A ("LG Chem '810") (Year: 2017).*

(Continued)

*Primary Examiner* — George R Koch
(74) *Attorney, Agent, or Firm* — Dentons US LLP

(57) ABSTRACT

A display unit manufacturing system including: a panel conveyance route including an optical film attaching unit configured to attach an optical film to a panel; an inspection unit which inspects whether the panel having the optical film attached thereto is defective and identifies a defective panel; a panel storing unit which stores the defective panel after the optical film is separated therefrom; and a control unit which controls whether the panel stored in the panel storing unit is supplied to the panel conveyance route.

5 Claims, 3 Drawing Sheets

(56) References Cited

FOREIGN PATENT DOCUMENTS

| | | |
|---|---|---|
| JP | 2015108663 A | 6/2015 |
| JP | 2016-121981 A | 7/2016 |
| JP | 2017094477 A | 6/2017 |
| JP | 6269793 B1 | 1/2018 |
| KR | 10-2004-0041285 A | 5/2004 |
| KR | 10-0976191 B1 | 4/2010 |
| KR | 10-2010-0096301 A | 9/2010 |
| KR | 10-2013-0031356 A | 3/2013 |
| KR | 10-2013-0109486 A | 10/2013 |
| KR | 10-1399973 B1 | 6/2014 |
| KR | 10-2016-0126658 A | 11/2016 |
| KR | 10-2017-0092355 A | 8/2017 |
| KR | 10-2017-011981 A | 10/2017 |
| KR | 10-2017-0119810 A | 10/2017 |

OTHER PUBLICATIONS

Translation of KR 10-2017-0092355 A ("LG Chem '355") (Year: 2017).*

* cited by examiner

DISPLAY UNIT MANUFACTURING SYSTEM

CROSS-REFERENCE TO RELATED APPLICATIONS

This application is a U.S. national stage of international application No. PCT/KR2019/003237 filed Mar. 20, 2019, and claims priority from Korean Application No. KR 10-2018-0034080 filed Mar. 23, 2018, the contents of which are incorporated in their entirety as if fully set forth herein.

TECHNICAL FIELD

The present invention relates to a display unit manufacturing system that manufactures a display unit by attaching an optical film to a panel.

BACKGROUND

Recently, research is being actively conducted to improve production efficiency of an optical film attaching system that manufactures an optical display element by attaching an optical film to a panel.

Meanwhile, the optical display element, which is manufactured by attaching the optical film to the panel, sometimes needs to be subjected to a post-process of mounting a driving chip on the optical display element that performs a display function by being operated by electric power.

A display unit for displaying an image may be manufactured by attaching an optical film to a liquid crystal panel or an organic EL panel.

A general display unit manufacturing system performs a process of continuously supplying and attaching the optical films to multiple panels, and during this process, defects in the panels having the optical films attached thereto may occur due to a deviation of an attachment position of the optical film, an inflow of foreign substances, or the like.

It is necessary to separate the optical film from the defective panel and attach another optical film to the panel again.

The related art, which is associated with the management of the panel determined to be defective, uses a method of separately unloading a panel when a defect of the panel having an optical film attached thereto is detected, separating the optical film from the panel, and manually attaching another optical film to the panel, or attaching an optical film by using an optical film attaching device which is not disposed on a continuous process line. For this reason, it is necessary to establish an unloading line for unloading the defective panel and/or provide a separate attachment device for attaching an optical film to the panel which is determined to be defective and from which the optical film is separated, in addition to the optical film attaching device used in the continuous process line. As a result, there are problems in that a space is wasted because of facility establishment and efficiency of a process speed deteriorates.

SUMMARY

Exemplary embodiments of the present invention are directed to providing a display unit manufacturing system capable of allowing a defective panel, from which an optical film is separated and which requires an optical film to be attached to the panel again, to be managed during a continuous process of continuously conveying the panels.

Exemplary embodiments of the present invention provide a display unit manufacturing system including: a panel conveyance route which includes an optical film attaching unit configured to attach an optical film to a panel; an inspection unit which inspects whether the panel having the optical film attached thereto is defective; a panel storing unit which stores the panel from which the optical film is separated, based on an inspection result of the inspection unit; and a control unit which controls whether to supply the panel stored in the panel storing unit to the panel conveyance route.

In an exemplary embodiment, the control unit may control the panel storing unit so that the panel stored in the panel storing unit is supplied to the panel conveyance route when the supply of the panel from an upstream side of the panel conveyance route is not busy.

In an exemplary embodiment, the display unit manufacturing system may include: a separation unit which separates the optical film from the panel when it is determined based on the inspection result of the inspection unit that the panel is defective and the defect is caused by the optical film; and a panel auxiliary conveyance route which conveys the panel from the separation unit to the panel storing unit.

In an exemplary embodiment, the panel conveyance route may include: a first panel conveyance route which includes a first optical film attaching unit configured to attach a first optical film to one surface of the panel; and a second panel conveyance route which includes a second optical film attaching unit configured to attach a second optical film to the other surface of the panel.

In an exemplary embodiment, the panel storing unit may include: a first panel storing unit which stores the panel from which the first optical film is separated, and supplies the stored panel to the first panel conveyance route; and a second panel storing unit which stores the panel from which the second optical film is separated, and supplies the stored panel to the second panel conveyance route.

In an exemplary embodiment, the display unit manufacturing system may further include a separation unit which separates an optical film, which causes a defect, from the panel when it is determined based on the inspection result of the inspection unit that the panel is defective and the defect is caused by at least any one of the first optical film and the second optical film, in which the separation unit separates both of the first optical film and the second optical film from the panel when it is determined by the inspection unit that the defect is caused by both of the first optical film and the second optical film, and the first panel storing unit stores the panel from which both of the first optical film and the second optical film are separated.

In an exemplary embodiment, the first optical film attaching unit may include a pair of rollers which are disposed to be vertically spaced apart from each other with the panel interposed therebetween, and an interval between the pair of rollers may be adjusted based on whether the second optical film is attached to the panel supplied from the first panel storing unit to the first panel conveyance route.

According to an exemplary embodiments of the present invention, the display unit manufacturing system according to the exemplary embodiment of the present invention includes: the panel storing unit which stores the panel from which the optical film is separated, when it is determined based on the inspection result of the inspection unit that the panel having the optical film attached thereto is defective; and a control unit which controls whether to supply the panel stored in the panel storing unit to the panel conveyance route along which the process of attaching the optical film to the panel is continuously performed. As a result, there is an advantage in that it is possible to reduce a space for separate facility establishment and management of the continuous process without decreasing a process speed in that, in terms of the management of the panel determined to be defective that the panel is reused by separating the optical film from the panel determined to be defective, the panel conveyance route of the continuous process, particularly, the optical film attaching unit on the panel conveyance route can be used.

REFERENCE NUMERALS USED HEREIN

Figure 1:
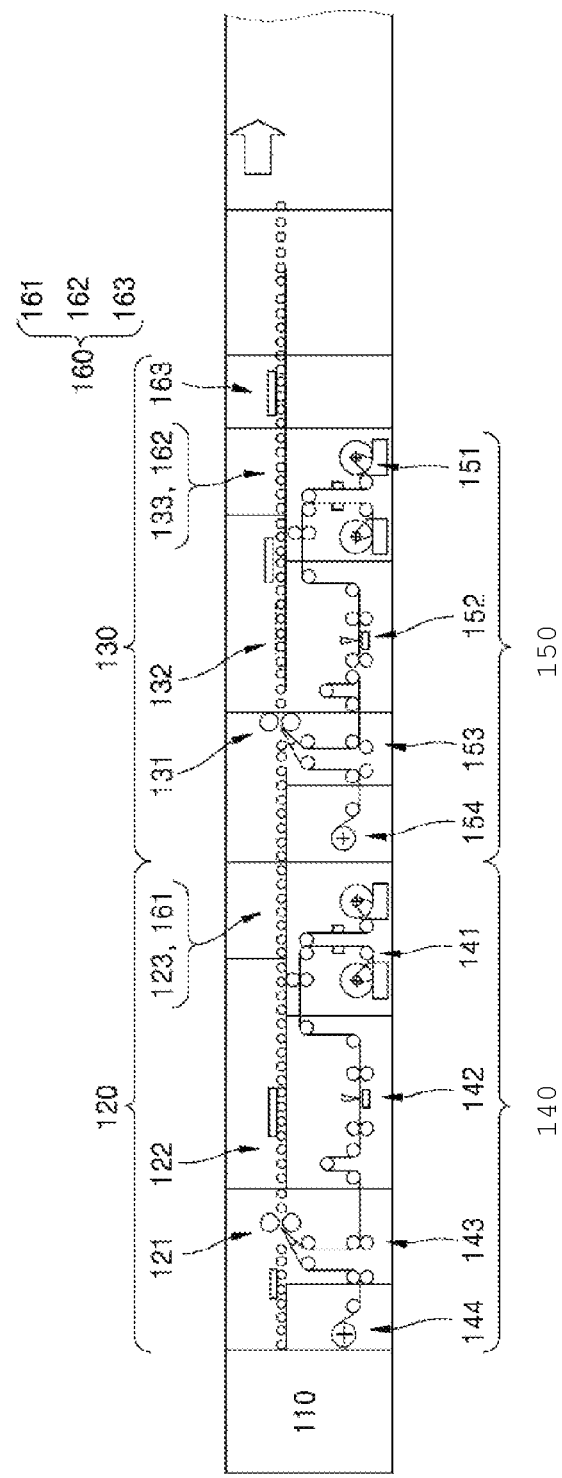
FIG. 1 is a side view of a display unit manufacturing system according to an exemplary embodiment.

100: Display unit manufacturing system
110: Panel supply unit
120: First panel conveyance route
121a, 121b: Roller
121: First optical film attaching unit
130: Second panel conveyance route
131: Second optical film attaching unit
140: First optical film conveyance route
150: Second optical film conveyance route
160: Inspection unit
170: Panel storing unit
S1, S2: Auxiliary conveyance route

DETAILED DESCRIPTION

The present invention will be apparent with reference to exemplary embodiments to be described below in detail together with the accompanying drawings. However, the present invention is not limited to the exemplary embodiments disclosed herein but will be implemented in various forms. The exemplary embodiments are provided so that the present invention is completely disclosed, and a person with ordinary skill in the art can fully understand the scope of the present invention. Therefore, the present invention will be defined only by the scope of the appended claims. Meanwhile, the terms used in the present specification are for explaining the exemplary embodiments, not for limiting the present invention. Unless particularly stated otherwise in the present specification, a singular form also includes a plural form. In addition, the terms such as "comprises (includes)" and/or "comprising (including)" used in the specification do not exclude presence or addition of one or more other constituent elements, steps, operations, and/or elements, in addition to the mentioned constituent elements, steps, operations, and/or elements. The terms such as "first" and "second" may be used to describe various constituent elements, but the constituent elements should not be limited by the terms. These terms are used only to distinguish one constituent element from another constituent element.

Figure 2:
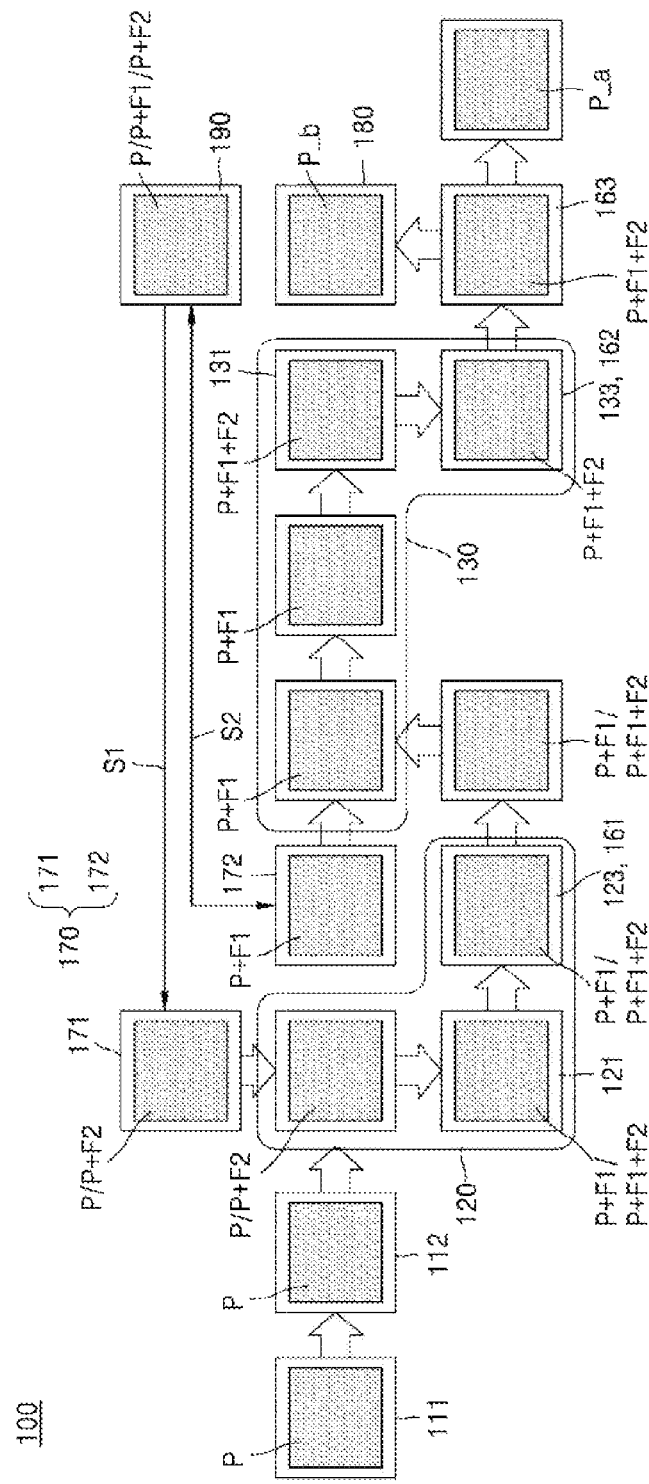
FIG. 2 is a top plan view of the display unit manufacturing system of FIG. 1 supplied.

FIG. 1 is a schematic side view of a display unit manufacturing system according to an exemplary embodiment of the present invention, and FIG. 2 is a schematic top plan view of the display unit manufacturing system according to the exemplary embodiment of the present invention.

As illustrated in FIGS. 1 and 2, a display unit manufacturing system 100 according to an exemplary embodiment of the present invention may include a panel supply unit 110, panel conveyance routes 120 and 130, a first optical film conveyance route 140, a second optical film conveyance route 150, an inspection unit 160, panel storing units 170, and a control unit (not illustrated), so as to manufacture a display unit by attaching an optical film to a panel.

The panel used in the exemplary embodiment of the present invention may be, but not limited to, a liquid crystal panel having a liquid crystal layer and/or an OLED panel having an organic EL layer. Meanwhile, in the case of the liquid crystal panel, since optical films each having polarizing films provided on both surfaces thereof need to be disposed to form a cross-nicol relationship, the optical films may need to be attached to one surface and the other surface of the panel, that is, the optical films may need to be attached thereto at least twice. In the case of the OLED panel, since an optical film having a polarizing film is disposed on only one surface thereof, the optical film may need to be attached only once. For convenience of description, the description will be made below based on the liquid crystal panel that needs to have the optical films attached to both surfaces thereof.

The panel supply unit 110 may include a panel input unit 111 which supplies a panel P conveyed from the outside so that the panel P may be conveyed along the panel conveyance routes 120 and 130, and a panel cleaning unit 112 which cleans the panel P supplied from the panel input unit 111.

The panel conveyance routes 120 and 130 may be panel conveyance routes in which the panels supplied from the panel supply unit 110 are conveyed and the optical films are attached to the panels. The panel conveyance routes 120 and 130 may include optical film attaching units 121 and 131 which attach the optical films to the panels, respectively. The types of the optical film attaching units 121 and 131 are not limited as long as the optical film attaching units 121 and 131 may attach the optical films to the panels. As an example, it is possible to use a pair of rollers capable of pressing the panel and the optical film and allowing the pressed panel and optical film to pass therethrough. The panel conveyance routes may include the first panel conveyance route 120 which includes the first optical film attaching unit 121 for attaching a first optical film F1 to one surface of the panel P, and the second panel conveyance route 130 which includes the second optical film attaching unit 131 for attaching a second optical film F2 to the other surface of the panel P.

The first panel conveyance route 120 may include the first optical film attaching unit 121 which attaches the first optical film F1 to the panel, a panel turning/reversing unit 122 which is disposed at a downstream side from the first optical film attaching unit 121 and horizontally rotates and/or reverses, upside down, the panel having the optical film attached to one surface thereof, and a first optical film attachment position measuring unit 123 which is disposed at a downstream side from the panel turning/reversing unit 122 and measures an attachment position of the first optical film F1.

The second panel conveyance route 130 may include the second optical film attaching unit 131 which is disposed at a downstream side from the first optical film attachment position measuring unit 123 and attaches the second optical film F2 to the panel P, a panel reversing unit 132 which is disposed at a downstream side from the second optical film attaching unit 131 and reverses the panel having the optical films attached to both surfaces thereof, and a second optical film attachment position measuring unit 133 which is disposed at a downstream side from the panel reversing unit 132 and measures an attachment position of the second optical film F2.

The first optical film conveyance route 140 may include a first optical film supply unit 141 which is disposed at a most upstream side of the first optical film conveyance route 140 and supplies the first optical film F1, a first optical film cutting unit 142 which is disposed at a downstream side from the first optical film supply unit 141 and cuts the first optical film F1 supplied from the first optical film supply unit 141, a first optical film separating unit 143 which is disposed at a downstream side from the first optical film cutting unit 142 and separates a first carrier film from the first optical film F1, and a first carrier film winding unit 144 which is disposed at a most downstream side of the first optical film conveyance route 140 and winds the first carrier film which is separated from the first optical film F1 in order to attach the first optical film F1 to the panel P.

The second optical film conveyance route 150 may include a second optical film supply unit 151 which is disposed at a most upstream side of the second optical film conveyance route 150 and supplies the second optical film F2, a second optical film cutting unit 152 which is disposed at a downstream side from the second optical film supply unit 151 and cuts the second optical film F2 supplied from the second optical film supply unit 151, a second optical film separating unit 153 which is disposed at a downstream side from the second optical film cutting unit 152 and separates a second carrier film from the second optical film F2, and a second carrier film winding unit 154 which is disposed at a most downstream side of the second optical film conveyance route 150 and winds the second carrier film which is separated from the second optical film F2 in order to attach the second optical film F2 to the panel P.

The inspection unit 160 may inspect whether the panel P having the optical films F1 and F2 attached thereto is defective. The inspection unit 160 may include the first optical film attachment position measuring units 123 and 161, the second optical film attachment position measuring units 133 and 162, and a defect inspection unit 163.

The first optical film attachment position measuring units 123 and 161 or the second optical film attachment position measuring units 133 and 162 may inspect whether the optical films F1 and F2 are attached at appropriate positions of the panel P based on image acquisition and calculation by an image capturing device (not illustrated).

The defect inspection unit 163 may inspect whether the panel P having the optical films F1 and F2 attached thereto is defective through automatic optical inspection (AOI) that automatically determines whether the panel is defective based on a predetermined optical inspection reference. Here, the defect may mean an inflow of foreign substances or bubbles, scratches on the optical film, damage to the optical film, and the like.

Further, the determination result of the inspection unit 160, that is, the determination result regarding whether the inspected panel P is a panel determined to be good P_a or a panel determined to be defective P_d or whether a defect is caused by the first optical film F1 or the second optical film F2 may be transmitted to a predetermined control unit (not illustrated).

The control unit may control a conveyance line so that the panel determined to be good P_a may be conveyed to a route for a subsequent process. In a case in which it is determined that the defect of the panel determined to be defective P_b is caused by the optical films F1 and F2, the control unit may control the conveyance line so that the panel may be conveyed to a route for separating the optical films F1 and F2.

The panel storing unit 170 may store the panels from which the optical films are separated, based on the inspection result of the inspection unit 160. The panel storing unit 170 may be a cassette having multiple partitioned spaces to store the multiple panels. The panel storing unit 170 may include a first panel storing unit 171 and a second panel storing unit 172.

The first panel storing unit 171 may store the panel P from which the first optical film F1 is separated, and the first panel storing unit 171 may supply the stored panel P to the first panel conveyance route 120.

The second panel storing unit 172 may store the panel P from which the second optical film F2 is separated, and the second panel storing unit 172 may supply the stored panel P to the second panel conveyance route 130.

The control unit may control whether to supply the panel stored in the panel storing unit 170 to the panel conveyance routes 120 and 130. For example, the control unit may control the panel storing unit 170 such that the panels stored in the panel storing unit 170 may be supplied to the panel conveyance routes 120 and 130 when the supply of the panels P from the upstream sides of the panel conveyance routes 120 and 130 is not busy. Therefore, there is an advantage in that it is possible to continuously perform the process of attaching the optical films along the panel conveyance routes 120 and 130 even though the supply of the panels P from the upstream sides of the panel conveyance routes 120 and 130 is ceased or slow.

The display unit manufacturing system 100 according to the exemplary embodiment of the present invention may further include a separation unit 180, a panel cleaning unit 190, and panel auxiliary conveyance routes S1 and S2.

When it is determined based on the inspection result of the inspection unit 160 that the panel is defective and the defect is caused by the optical films F1 and F2, the separation unit 180 may be a device which separates the optical films F1 and F2 from the panel P. When it is determined based on the inspection result of the inspection unit 160 that the panel is defective and the defect is caused by at least any one of the first optical film F1 and the second optical film F2, the separation unit 180 may separate the optical films F1 and F2, which have caused the defect, from the panel P. For example, when it is determined that the defect is caused by any one of the first optical film F1 and the second optical film F2, the separation unit 180 may separate the one optical film without separating the other optical film. When it is determined that the defect is caused by both of the first optical film F1 and the second optical film F2, the separation unit 180 may separate both of the first optical film F1 and the second optical film F2.

In this case, the panel P from which both of the first optical film F1 and the second optical film F2 are separated by the separation unit 180 as it is determined that the defect is caused by both of the first optical film F1 and the second optical film F2 may be stored in the first panel storing unit 171 instead of the second panel storing unit 172.

There is a likelihood that the panel P from which the optical films F1 and F2 are separated is contaminated by an adhesive agent or other foreign substances, and thus the panel cleaning unit 190 may be provided to remove the contaminants.

The panel auxiliary conveyance routes S1 and S2 may be routes for conveying the panels from the separation unit 180 and the panel cleaning unit 190 to the panel storing units 171 and 172.

Figure 3A:
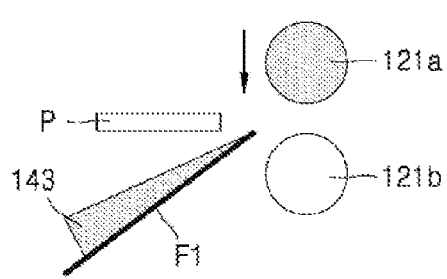
FIGS. 3A and 3B are schematic illustrations of the operating states of a first optical film attaching unit in accordance with types of panels.
Figure 3B:
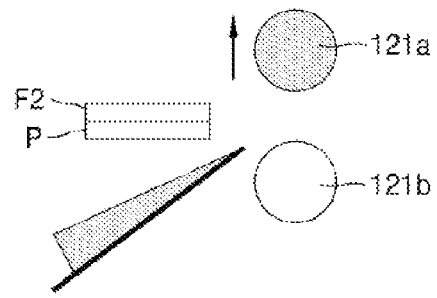

FIGS. 3A and 3B are schematic illustrations of the operating states of the first optical film attaching unit in accordance with types of panels.

The first panel storing unit 171 may store two types of panels: a panel P+F2 from which only the first optical film F1 is separated instead of the second optical film F2; and the panel P from which both of the first optical film F1 and the second optical film F2 are separated.

Meanwhile, the description will be made below assuming that the supply of the panel from the upstream side of the first panel conveyance route 120 is not busy and thus the panel is supplied from the first panel storing unit 171 to the first panel conveyance route 120.

In general, a panel having no optical film attached thereto is supplied to the first optical film attaching unit 121. However, in the exemplary embodiment of the present invention, among the panels stored in the first panel storing unit 171, the panel P+F2 from which only the first optical film F1 is separated, that is, the panel P+F2 having the second optical film F2 attached thereto may be sometimes supplied to the first optical film attaching unit 121.

Therefore, an interval between a pair of rollers 121a and 121b may be adjusted based on whether the second optical film F2 is attached to the panel supplied from the first panel storing unit 171 to the first panel conveyance route 120. As one example, at least one of the pair of rollers 121a and 121b includes a rubber-based elastic material, such that the rubber roller including the elastic material may be elastically deformed corresponding to a thickness of the supplied panel depending on whether the second optical film F2 is attached. As another example, at least one roller 121a of the pair of rollers 121a and 121b is controlled to be moved upward or downward, such that an interval between the pair of rollers 121a and 121b may be adjusted depending on whether the second optical film F2 is attached to the panel P. That is, the interval between the pair of rollers 121a and 121b may be further increased in the case of FIG. 3B in which the second optical film F2 is attached to the panel P than in the case of FIG. 3A in which the second optical film F2 is not attached to the panel P.

Meanwhile, in the case in which the panel P+F2 having the second optical film F2 attached thereto is supplied to the first panel conveyance route 120 and the first optical film F1 is attached to the panel P+F2, a panel P+F1+F2 having the first optical film F1 attached thereto may be conveyed to the second panel conveyance route 130 like the common process or may be conveyed along a separate conveyance line (not illustrated) so that a subsequent process may be performed. If the panel P+F1+F2 is conveyed to the second panel conveyance route 130, the process of attaching the second optical film by using the second optical film attaching unit 131 may be omitted with respect to the panel P+F1+F2 because the panel P+F1+F2 has both of the first optical film F1 and the second optical film F2 attached thereto.

Meanwhile, the related art management method for panels determined to be defective, uses a method of separately unloading a panel when a defect of the panel having an optical film attached thereto is detected, separating the optical film from the panel, and manually attaching another optical film to the panel, or attaching an optical film by using an optical film attaching device which is not disposed on a continuous process line. For this reason, it is necessary to establish an unloading line for unloading the defective panel and/or provide a separate attachment device for attaching an optical film to the panel which is determined to be defective and from which the optical film is separated, in addition to the optical film attaching device used in the continuous process line. As a result, there are problems in that a space is wasted because of facility establishment and efficiency of a process speed deteriorates.

In contrast, the display unit manufacturing system according to the exemplary embodiment of the present invention includes: the panel storing unit which stores the panel from which the optical film is separated when it is determined based on the inspection result of the inspection unit that the panel having the optical film attached thereto is defective; and a control unit which controls whether to supply the panel stored in the panel storing unit to the panel conveyance route along which the process of attaching the optical film to the panel is continuously performed. As a result, there is an advantage in that it is possible to reduce a space for separate facility establishment and manage the continuous process without decreasing a process speed in that, in terms of the management of the panel determined to be defective that the panel is reused by separating the optical film from the panel determined to be defective, the panel conveyance route of the continuous process, particularly, the optical film attaching unit on the panel conveyance route can be used.

While the present invention has been described with reference to the aforementioned exemplary embodiments, various modifications or alterations may be made without departing from the subject matter and the scope of the invention. Accordingly, the appended claims include the modifications or alterations as long as the modifications or alterations fall within the subject matter of the present invention.

The invention claimed is:

1. A display unit manufacturing system comprising:
a panel conveyance route including an optical film attaching unit for attaching an optical film to a panel to prepare a panel having an optical film attached thereto;
an inspection unit, which inspects the panel having the optical film attached thereto and identifies a defective panel;
a separation unit which separates the optical film from the defective panel;
a first panel storing unit, which stores a first panel, which is the panel from which a first optical film attached to a first surface thereof is separated, and supplies the first panel to the panel conveyance route;
a second panel storing unit, which stores a second panel, which is the panel from which a second optical film attached to a second surface thereof is separated, wherein the second surface of the panel is opposite to the first surface of the panel, and supplies the second panel to the panel conveyance route;
an auxiliary conveyance route connecting the separation unit to the first and second panel storing units for conveying the first and second panels to the panel storing units, and
a control unit which controls whether to supply the first and second panels stored in the first and second panel storing units, respectively, to the panel conveyance route.

2. The display unit manufacturing system of claim 1, wherein the control unit controls the first and second panel storing units, and the first and second panel storing units supply the first and second panels stored in the first and second panel storing units to the first and second panel conveyance routes, respectively, when a supply of first and second panels from an upstream side of the panel conveyance route is not busy.

3. The display unit manufacturing system of claim 1, wherein the panel conveyance route includes:
   a first panel conveyance route, which includes a first optical film attaching unit to attach the first optical film to the first surface of the panel; and
   a second panel conveyance route, which includes a second optical film attaching unit to attach the second optical film to the second surface of the panel, wherein the second surface of the panel is opposite to the first surface of the panel.

4. The display unit manufacturing system of claim 1,
   wherein the separation unit separates either the first optical film or the second optical film from the panel when it is determined that the panel is defective and the defect is caused by the first optical film or the second optical film, respectively,
   wherein the separation unit separates both the first optical film and the second optical film from the panel when it is determined that the panel is defective and the defect is caused by both the first optical film and the second optical film, and
   wherein the first panel storing unit further stores the panel from which both the first optical film and the second optical film are separated.

5. The display unit manufacturing system of claim 1, wherein the optical film attaching unit includes a pair of rollers which are disposed to be vertically spaced apart from each other with the panel interposed therebetween, and an interval between the pair of rollers is adjusted based on whether the second optical film is attached to the panel supplied from the first panel storing unit to the first panel conveyance route.

* * * * *